No. 725,413. PATENTED APR. 14, 1903.
M. W. COTTLE.
STEAM SEPARATOR.
APPLICATION FILED JULY 21, 1902.
NO MODEL.
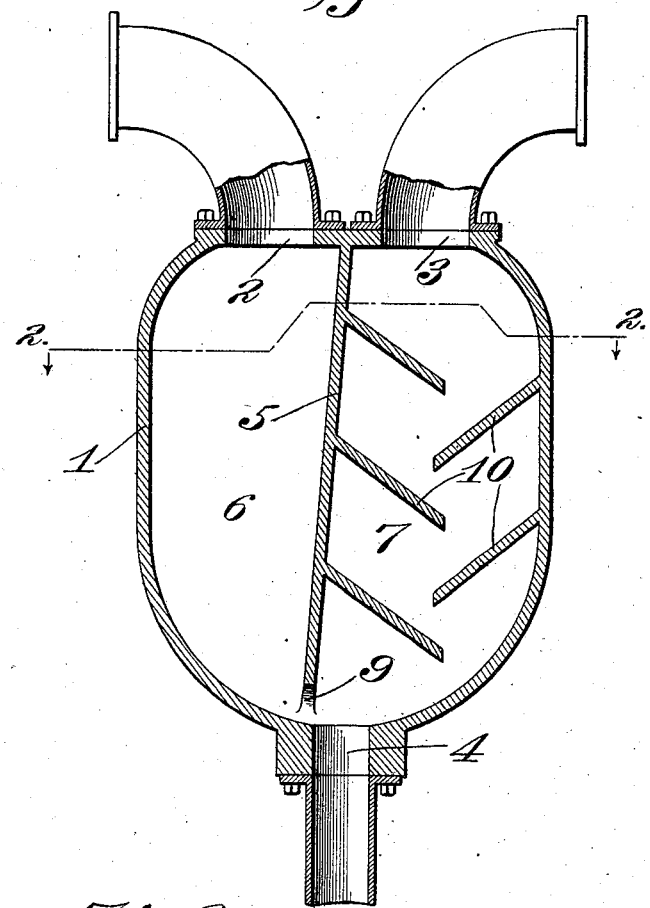
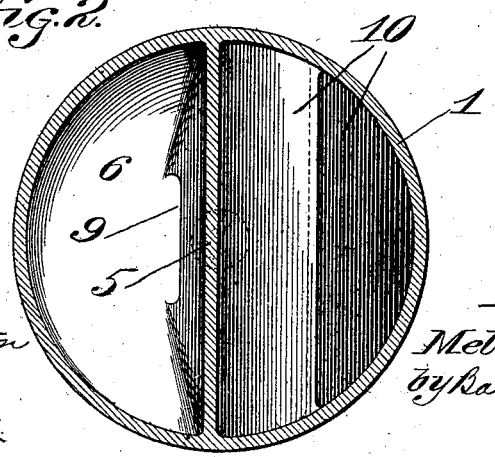
Witnesses:
G. A. Pennington
Gales ?
Inventor:
Melvin W. Cottle,
by Bakewell & Cornwall
Attys.

UNITED STATES PATENT OFFICE.

MELVIN W. COTTLE, OF ST. LOUIS, MISSOURI, ASSIGNOR TO ALLEN STEAM TRAP AND SEPARATOR COMPANY, OF ST. LOUIS, MISSOURI, A CORPORATION OF MISSOURI.

STEAM-SEPARATOR.

SPECIFICATION forming part of Letters Patent No. 725,413, dated April 14, 1903.

Application filed July 21, 1902. Serial No. 116,382. (No model.)

*To all whom it may concern:*

Be it known that I, MELVIN W. COTTLE, a citizen of the United States, residing at St. Louis, Missouri, have invented a certain new and useful Improvement in Steam-Separators, of which the following is a full, clear, and exact description, such as will enable others skilled in the art to which it appertains to make and use the same, reference being had to the accompanying drawings, forming part of this specification, in which—

Figure 1 is a central vertical sectional elevation, and Fig. 2 is a top plan view on the line 2 2 of Fig. 1.

My invention relates to improvements in steam-separators, my object being to provide a device of simple construction and efficient operation. To these ends and also to improve generally upon devices of the character indicated my invention consists in the various matters hereinafter described and claimed.

Referring now more particularly to the drawings, 1 indicates a casing which is provided in its top wall with steam inlet and outlet openings 2 and 3, respectively, there being an outlet-opening 4 for the purpose of discharging the water of condensation in the bottom of said casing. Extending across the casing is a diaphragm or partition-wall 5, which extends downwardly from a point between the steam-openings to a point at the side of the water-outlet, whereby two compartments 6 and 7 are produced in the casing, the compartment 7 having both outlet-openings leading from the same. The diaphragm does not extend to the bottom wall of the casing throughout its entire lower end, so that a passage 9 is produced which communicates between the compartments 6 and 7. Extending from the opposite walls of the compartment 7 are downwardly-inclined plates 10, whose free edges overlap.

Steam being admitted to the compartment 6 through the inlet-opening 2 flows through the passage 9 and then upwardly through the compartment 7 to the outlet-opening 3, the steam in its passage engaging the downwardly-inclined plates 10 and the water of condensation collecting upon said plates and being discharged into the bottom of the casing, whence it flows through the discharge-opening 4. The inclined plates 10 cause the steam to whirl and form eddies in the angles between the said plates and their supporting-walls, whereby the water is thrown by centrifugal action, and the ends of the plates overlapping, as previously described, a tortuous channel is provided for the steam, the steam being directed from one plate to the under surface of the next. The water-outlet being upon the opposite side of the diaphragm 5 to that upon which the steam is admitted, the incoming steam does not flow directly into the discharge-opening 4, and thus produce undue pressure in the discharge-pipe.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

In a steam-separator, a casing having steam-inlet through its top wall, a steam-passage through said casing from top to bottom limited on one side by an obliquely-disposed straight-faced wall, extending nearly to the bottom of said casing, a discharge in the bottom of said casing, oblique downwardly-projecting overlapping plates at the opposite side of said wall, some of said plates being integral with said wall and others being integral with the outer shell of the casing, and a discharge through said top wall, above said overlapping plates; all combined and arranged substantially as described.

In testimony whereof I hereunto affix my signature, in the presence of two witnesses, this 8th day of July, 1902.

MELVIN W. COTTLE.

Witnesses:
GALES P. MOORE,
GEORGE BAKEWELL.